United States Patent
Araki et al.

(10) Patent No.: US 9,330,702 B2
(45) Date of Patent: May 3, 2016

(54) THERMALLY-ASSISTED MAGNETIC RECORDING HEAD HAVING A HEAT SINK

(71) Applicants: Hironori Araki, Milpitas, CA (US); Yoshitaka Sasaki, Santa Clara, CA (US); Hiroyuki Ito, Milpitas, CA (US); Shigeki Tanemura, Milpitas, CA (US); Yukinori Ikegawa, Milpitas, CA (US)

(72) Inventors: Hironori Araki, Milpitas, CA (US); Yoshitaka Sasaki, Santa Clara, CA (US); Hiroyuki Ito, Milpitas, CA (US); Shigeki Tanemura, Milpitas, CA (US); Yukinori Ikegawa, Milpitas, CA (US)

(73) Assignee: HEADWAY TECHNOLOGIES, INC., Milpitas, CA (US)

( * ) Notice: Subject to any disclaimer, the term of this patent is extended or adjusted under 35 U.S.C. 154(b) by 92 days.

(21) Appl. No.: 14/041,607

(22) Filed: Sep. 30, 2013

(65) Prior Publication Data

US 2015/0092525 A1 Apr. 2, 2015

(51) Int. Cl.
| | |
|---|---|
| *G11B 5/187* | (2006.01) |
| *G11B 5/31* | (2006.01) |
| *G11B 5/127* | (2006.01) |
| *G11B 5/60* | (2006.01) |
| *G02B 6/00* | (2006.01) |
| *G11B 5/40* | (2006.01) |
| *G11B 5/00* | (2006.01) |

(52) U.S. Cl.
CPC ............... *G11B 5/6088* (2013.01); *G02B 6/00* (2013.01); *G11B 5/314* (2013.01); *G11B 5/3133* (2013.01); *G11B 5/3136* (2013.01); *G11B 5/40* (2013.01); *G11B 5/313* (2013.01); *G11B 5/3116* (2013.01); *G11B 2005/0021* (2013.01); *G11B 2005/0024* (2013.01)

(58) Field of Classification Search
CPC ..................... G11B 2005/0021; G11B 5/3116; G11B 5/3133; G11B 5/607; G11B 5/6076; G11B 5/6088; G11B 7/0956; G11B 7/13925; G11B 7/13927; G11B 2007/0006; G11B 2007/0013; G11B 7/0935; G11B 7/1392; G11B 5/314; G11B 5/3136; G11B 13/08; G11B 5/4866; G11B 5/6082; G11B 2005/0024; G11B 5/1272; G11B 5/31; G11B 5/313; G02B 27/0025; G02B 13/18; Y10T 428/11; Y10T 29/49032
USPC ............... 360/59, 125.31, 125.75; 369/13.33, 369/112.27, 13.13
See application file for complete search history.

(56) References Cited

U.S. PATENT DOCUMENTS

| | | | |
|---|---|---|---|
| 8,462,594 B1 * | 6/2013 | Aoki et al. ................. | 369/13.33 |
| 8,634,280 B1 * | 1/2014 | Wang et al. ................ | 369/13.33 |
| 2011/0170381 A1 | 7/2011 | Matsumoto | |
| 2012/0050906 A1 * | 3/2012 | Balamane ............ | G11B 5/3136 360/59 |
| 2013/0050867 A1 * | 2/2013 | Yamane et al. ................. | 360/59 |
| 2014/0355400 A1 * | 12/2014 | Balamane ............. | G11B 5/187 369/13.17 |

* cited by examiner

*Primary Examiner* — Dionne H Pendleton
(74) *Attorney, Agent, or Firm* — Oliff PLC

(57) ABSTRACT

A thermally-assisted magnetic recording head includes a main pole, a waveguide, a plasmon generator, and a heat sink. The heat sink includes a first metal layer, a second metal layer, and an intermediate layer. The intermediate layer is interposed between the first metal layer and the second metal layer. Each of the first and second metal layers is formed of a metal material. The intermediate layer is formed of a material that is higher in Vickers hardness than the metal material used to form the first metal layer and the metal material used to form the second metal layer.

7 Claims, 8 Drawing Sheets

THERMALLY-ASSISTED MAGNETIC RECORDING HEAD HAVING A HEAT SINK

BACKGROUND OF THE INVENTION

1. Field of the Invention

The present invention relates to a thermally-assisted magnetic recording head for use in thermally-assisted magnetic recording in which a recording medium is irradiated with near-field light to lower the coercivity of the recording medium for data writing.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head unit including a magnetoresistive element (hereinafter, also referred to as MR element) for reading and a write head unit including an induction-type electromagnetic transducer for writing are stacked on a substrate. In a magnetic disk drive, the thin-film magnetic head is mounted on a slider that flies slightly above the surface of a recording medium.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To solve the foregoing problems, there has been proposed a technology so-called thermally-assisted magnetic recording. The technology uses a recording medium having high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating near-field light is typically guided through a waveguide, which is provided in the slider, to the plasmon generator disposed near the medium facing surface of the slider.

U.S. Patent Application Publication No. 2011/0170381 A1 discloses a technology in which the surface of the core of the waveguide and the surface of the plasmon generator (near-field light generating element) are arranged to face each other with a gap therebetween, so that evanescent light that occurs from the surface of the core based on the light propagating through the core is used to excite surface plasmons on the plasmon generator to generate near-field light based on the excited surface plasmons.

A thermally-assisted magnetic recording head that employs a plasmon generator as a source of generation of near-field light is configured so that the write head unit includes the plasmon generator and a main pole for producing a write magnetic field. The plasmon generator and the main pole are located in close proximity to each other.

Part of the energy of the light propagating through the core is transformed into heat in the plasmon generator. This gives rise to the following problems. First, during operation of the thermally-assisted magnetic recording head, the plasmon generator and its surroundings rise in temperature. As a result, the plasmon generator and its surroundings expand, and thus a portion of the medium facing surface protrudes toward the recording medium. This causes an end of the read head unit located in the medium facing surface to get farther from the recording medium, thereby causing the problem that a servo signal cannot be read during write operation. Further, the temperature rise of the plasmon generator may cause the plasmon generator to be deformed or broken.

U.S. Patent Application Publication No. 2011/0170381 A1 discloses a technology of providing a metallic layer beside the main pole, that is, on opposite sides of the main pole in the track width direction. This metallic layer functions as a heat sink to facilitate dissipation of heat from the plasmon generator. Providing such a heat sink near the plasmon generator allows for suppressing the temperature rise of the plasmon generator.

A heat sink is formed of a material having a high thermal conductivity. Au is a typical material having a high thermal conductivity. However, since Au is relatively soft, forming an entire heat sink of Au gives rise to problems as discussed below.

When the plasmon generator rises in temperature during operation of the thermally-assisted magnetic recording head, the heat sink also rises in temperature. If the entire heat sink is formed of Au, the temperature rise of the heat sink may result in deformation or breakage of the heat sink due to aggregation. Further, if the entire heat sink is formed of Au, the heat sink may be mechanically deformed or broken upon contact of the medium facing surface with the recording medium. When deformed or broken, the heat sink becomes unable to fully perform its function. As a result, there arise the foregoing problems associated with the temperature rise of the plasmon generator. Thus, a thermally-assisted magnetic recording head including a heat sink that is formed entirely of Au has the drawback of being low in reliability.

OBJECT AND SUMMARY OF THE INVENTION

It is an object of the present invention to provide a thermally-assisted magnetic recording head of high reliability that is capable of suppressing the temperature rise of the plasmon generator.

A thermally-assisted magnetic recording head of the present invention includes a medium facing surface facing a recording medium, a main pole producing a write magnetic field for writing data on the recording medium, a waveguide, a plasmon generator, and a heat sink facilitating dissipation of heat from the plasmon generator. The waveguide includes a core through which light propagates, and a cladding provided around the core. The plasmon generator is configured to excite a surface plasmon based on the light propagating through the core.

The heat sink includes a first metal layer, a second metal layer, and an intermediate layer. The intermediate layer is interposed between the first metal layer and the second metal layer. Each of the first and second metal layers is formed of a metal material. The intermediate layer is formed of a material that is higher in Vickers hardness than the metal material used to form the first metal layer and the metal material used to form the second metal layer.

In the thermally-assisted magnetic recording head of the present invention, each of the first metal layer, the second metal layer and the intermediate layer may have an end located in the medium facing surface.

In the thermally-assisted magnetic recording head of the present invention, the intermediate layer may be smaller in thickness than the first and second metal layers.

In the thermally-assisted magnetic recording head of the present invention, the material used to form the intermediate layer may be a metal material different from the metal material used to form the first metal layer and the metal material used to form the second metal layer, or may be a dielectric material.

In the thermally-assisted magnetic recording head of the present invention, the metal material used to form the first metal layer and the metal material used to form the second metal layer may both be Au.

In the thermally-assisted magnetic recording head of the present invention, the core may have an evanescent light generating surface to generate evanescent light based on the light propagating through the core. In this case, the plasmon generator may have a core facing surface facing the evanescent light generating surface. The cladding may include an interposition part interposed between the evanescent light generating surface and the core facing surface.

In the thermally-assisted magnetic recording head of the present invention, the plasmon generator and the main pole may be aligned along the direction of travel of the recording medium. In this case, the heat sink may include two portions located on opposite sides of the main pole in the track width direction.

The present invention makes it possible to provide a thermally-assisted magnetic recording head of high reliability that is capable of preventing deformation or breakage of the heat sink and thereby allows for suppression of the temperature rise of the plasmon generator.

Other and further objects, features and advantages of the present invention will appear more fully from the following description.

DETAILED DESCRIPTION OF THE PREFERRED EMBODIMENTS

First Embodiment

Figure 3:
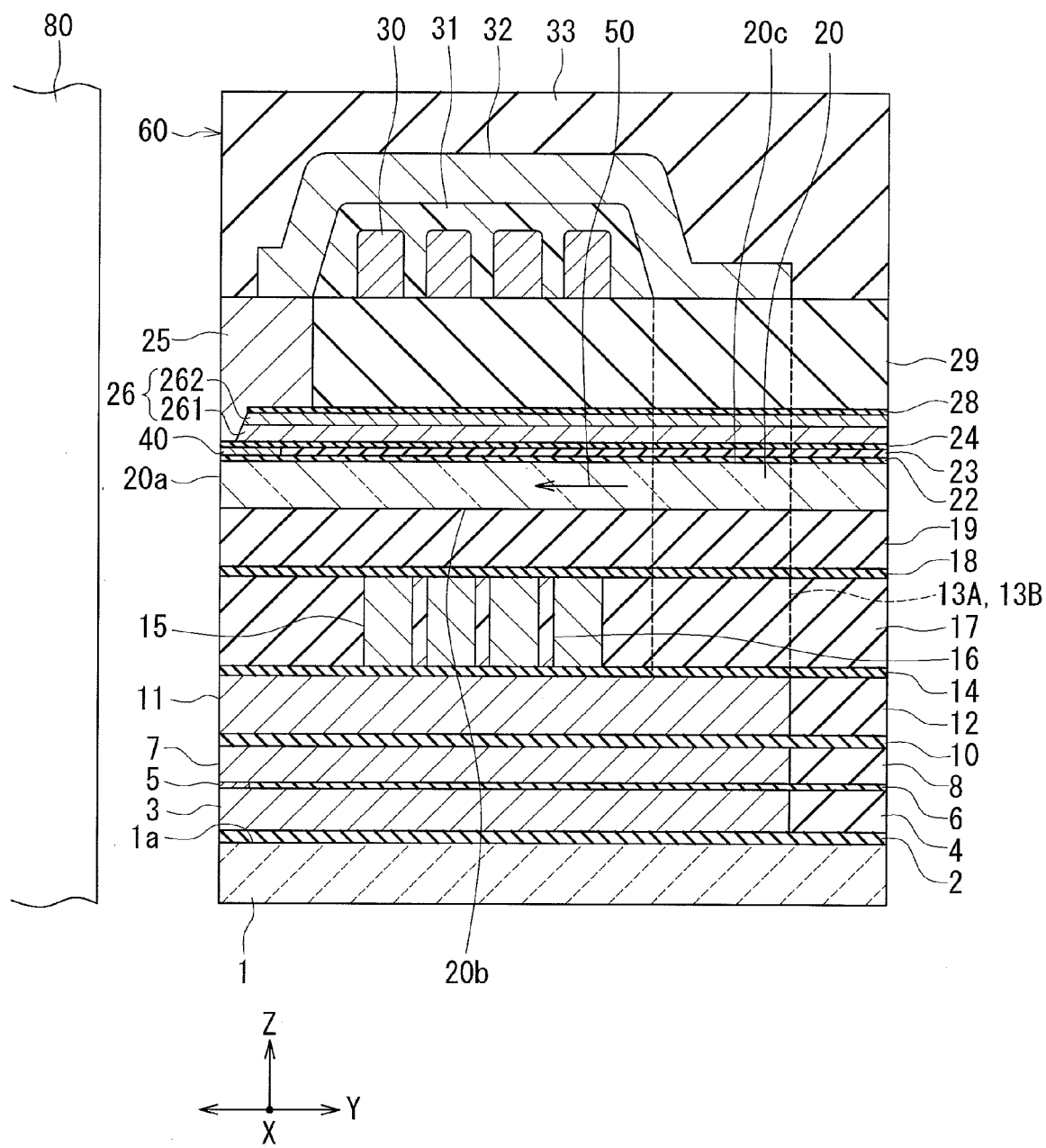
FIG. 3 is a cross-sectional view showing the configuration of the thermally-assisted magnetic recording head according to the first embodiment of the invention.
Figure 4:
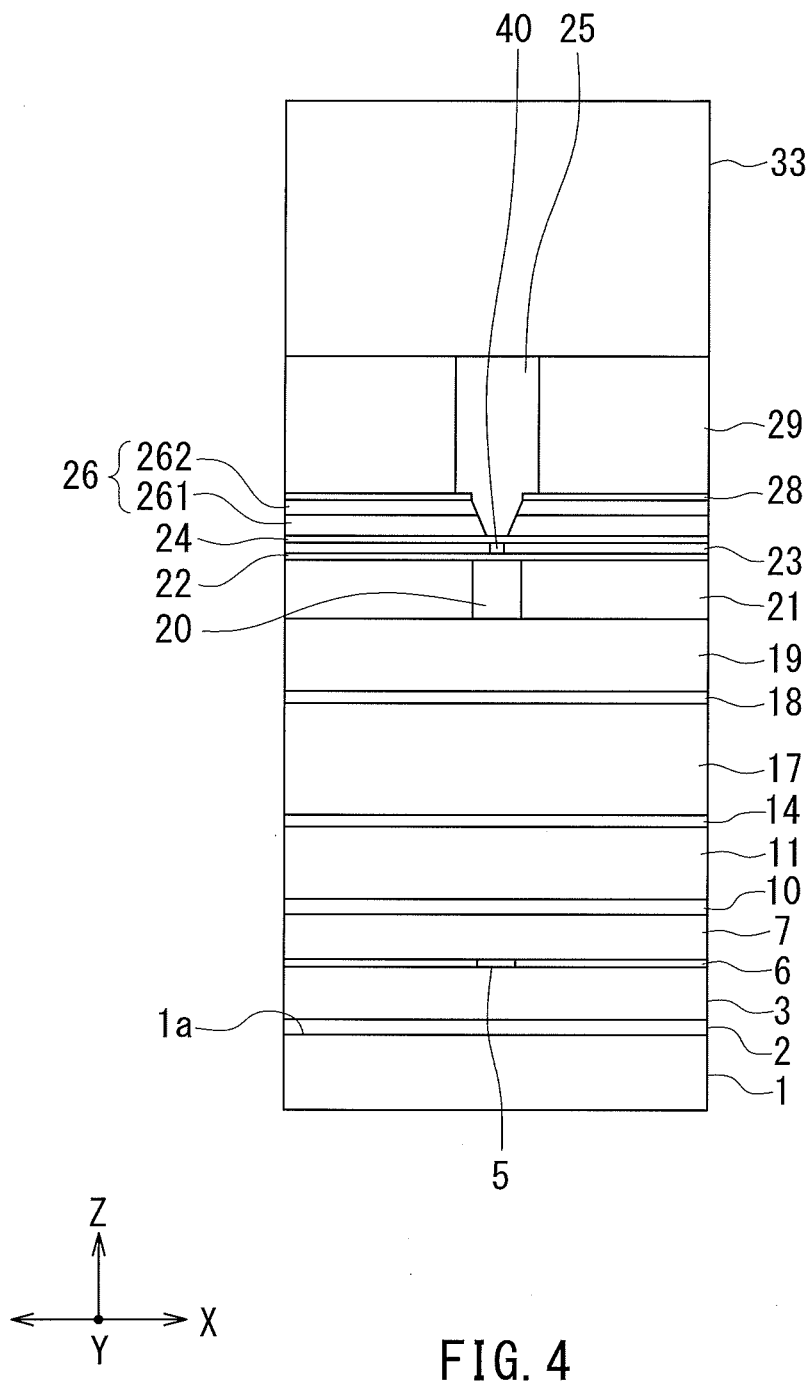
FIG. 4 is a front view showing the medium facing surface of the thermally-assisted magnetic recording head according to the first embodiment of the invention.

Preferred embodiments of the present invention will now be described in detail with reference to the drawings. First, reference is made to FIG. 3 and FIG. 4 to describe the configuration of a thermally-assisted magnetic recording head according to a first embodiment of the invention. FIG. 3 is a cross-sectional view showing the configuration of the thermally-assisted magnetic recording head. FIG. 4 is a front view showing the medium facing surface of the thermally-assisted magnetic recording head.

The thermally-assisted magnetic recording head according to the present embodiment is for use in perpendicular magnetic recording, and is in the form of a slider to fly over the surface of a rotating recording medium. When the recording medium rotates, an airflow passing between the recording medium and the slider causes a lift to be exerted on the slider. The slider is configured to fly over the surface of the recording medium by means of the lift.

As shown in FIG. 3, the thermally-assisted magnetic recording head has a medium facing surface 60 facing a recording medium 80. Here, X direction, Y direction, and Z direction will be defined as follows. The X direction is the direction across the tracks of the recording medium 80, i.e., the track width direction. The Y direction is a direction perpendicular to the medium facing surface 60. The Z direction is the direction of travel of the recording medium 80 as viewed from the slider. The X, Y, and Z directions are orthogonal to one another.

As shown in FIG. 3 and FIG. 4, the thermally-assisted magnetic recording head includes: a substrate 1 formed of a ceramic material such as aluminum oxide-titanium carbide ($Al_2O_3$—TiC) and having a top surface 1a; an insulating layer 2 formed of an insulating material and disposed on the top surface 1a of the substrate 1; a bottom shield layer 3 formed of a magnetic material and disposed on the insulating layer 2; and an insulating layer 4 disposed on the insulating layer 2 and surrounding the bottom shield layer 3. The insulating layers 2 and 4 are formed of alumina ($Al_2O_3$), for example. The Z direction is also a direction perpendicular to the top surface 1a of the substrate 1.

The thermally-assisted magnetic recording head further includes: a magnetoresistive (MR) element 5 serving as a read element disposed on the bottom shield layer 3; an insulating layer 6 disposed on the bottom shield layer 3 and the insulating layer 4 and surrounding the MR element 5; a top shield layer 7 formed of a magnetic material and disposed on the MR element 5 and the insulating layer 6; and an insulating layer 8 disposed on the insulating layer 6 and surrounding the top shield layer 7. The insulating layers 6 and 8 are formed of alumina, for example. The parts from the bottom shield layer 3 to the top shield layer 7 constitute a read head unit.

An end of the MR element 5 is located in the medium facing surface 60. The MR element 5 may be an element formed of a magneto-sensitive film that exhibits a magnetoresistive effect, such as a giant magnetoresistive (GMR) element or a tunneling magnetoresistive (TMR) element. GMR elements and TMR elements each typically include a free layer, a pinned layer, a spacer layer located between the free layer and the pinned layer, and an antiferromagnetic layer located on a side of the pinned layer farther from the spacer layer. The free layer is a ferromagnetic layer whose magnetization direction varies in response to a signal magnetic field. The pinned layer is a ferromagnetic layer whose magnetization direction is pinned. The antiferromagnetic layer is to pin the magnetization direction of the pinned layer by means of exchange coupling with the pinned layer. For GMR elements, the spacer layer is a nonmagnetic conductive layer. For TMR elements, the spacer layer is a tunnel barrier layer.

The GMR element may be of either the current-in-plane (CIP) type in which a current used for detecting magnetic signals is fed in a direction generally parallel to the planes of layers constituting the GMR element or the current-perpendicular-to-plane (CPP) type in which the current used for detecting magnetic signals is fed in a direction generally perpendicular to the planes of layers constituting the GMR element. Where the MR element 5 is a TMR element or a CPP-type GMR element, the bottom shield layer 3 and the top shield layer 7 may also serve as electrodes for feeding a sense current to the MR element 5. Where the MR element 5 is a CIP-type GMR element, insulating films are respectively provided between the MR element 5 and the bottom shield layer 3 and between the MR element 5 and the top shield layer 7, and two leads are provided between these insulating films in order to feed the sense current to the MR element 5.

The thermally-assisted magnetic recording head further includes a nonmagnetic layer 10 formed of a nonmagnetic material and disposed on the top shield layer 7 and the insulating layer 8, a return pole layer 11 formed of a magnetic material and disposed on the nonmagnetic layer 10, and an insulating layer 12 disposed on the nonmagnetic layer 10 and surrounding the return pole layer 11. The return pole layer 11 has an end face located in the medium facing surface 60. The nonmagnetic layer 10 and the insulating layer 12 are formed of alumina, for example.

The thermally-assisted magnetic recording head further includes two coupling portions 13A and 13B located away from the medium facing surface 60 and lying on a part of the return pole layer 11, an insulating layer 14 lying on another part of the return pole layer 11 and on the insulating layer 12, and a coil 15 lying on the insulating layer 14. The coupling portions 13A and 13B are formed of a magnetic material. Each of the coupling portions 13A and 13B includes a first layer lying on the return pole layer 11, and a second, a third, and a fourth layer stacked in this order on the first layer. The first layer of the coupling portion 13A and the first layer of the coupling portion 13B are aligned along the track width direction (the X direction). The coil 15 is planar spiral-shaped and wound around the first layers of the coupling portions 13A and 13B. The coil 15 is formed of a conductive material such as copper. The insulating layer 14 is formed of alumina, for example.

The thermally-assisted magnetic recording head further includes an insulating layer 16 disposed in the space between every adjacent turns of the coil 15, an insulating layer 17 disposed around the coil 15, and an insulating layer 18 disposed on the coil 15 and the insulating layers 16 and 17. The insulating layer 16 is formed of a photoresist, for example. The insulating layers 17 and 18 are formed of alumina, for example. The first layers of the coupling portions 13A and 13B are embedded in the insulating layers 14 and 17.

The thermally-assisted magnetic recording head further includes a waveguide. The waveguide includes a core 20 through which light propagates, and a cladding provided around the core 20. The core 20 has an end face 20a closer to the medium facing surface 60, a bottom surface 20b, an evanescent light generating surface 20c serving as a top surface, and two side surfaces connecting the bottom surface 20b and the evanescent light generating surface 20c to each other. The end face 20a may be located in the medium facing surface 60 or at a distance from the medium facing surface 60. FIG. 3 and FIG. 4 illustrate an example in which the end face 20a is located in the medium facing surface 60.

The cladding includes cladding layers 19, 21, and 22. The cladding layer 19 is disposed on the insulating layer 18. The core 20 is disposed on the cladding layer 19. The cladding layer 21 is disposed on the cladding layer 19 and surrounds the core 20. The evanescent light generating surface 20c of the core 20 and the top surface of the cladding layer 21 are even with each other. The cladding layer 22 is disposed over the evanescent light generating surface 20c and the top surface of the cladding layer 21.

The core 20 is formed of a dielectric material that transmits laser light to be used for generating near-field light. The laser light emitted from a laser diode (not illustrated) enters the core 20 and propagates through the core 20. The cladding layers 19, 21 and 22 are formed of a dielectric material that has a refractive index lower than that of the core 20. The material of the core 20 may be tantalum oxide such as $Ta_2O_5$, or SiON, for example. The material of the cladding layers 19, 21 and 22 may be alumina, SiON, or $SiO_2$, for example.

The second layers of the coupling portions 13A and 13B are embedded in the insulating layer 18 and the cladding layer 19. The third layers of the coupling portions 13A and 13B are embedded in the cladding layer 21. The third layer of the coupling portion 13A and the third layer of the coupling portion 13B are located on opposite sides of the core 20 in the track width direction (the X direction), each being at a distance from the core 20.

The thermally-assisted magnetic recording head further includes a plasmon generator 40. The plasmon generator 40 is disposed on the cladding layer 22 such that part of the cladding layer 22 is interposed between the plasmon generator 40 and the evanescent light generating surface 20c of the core 20. The plasmon generator 40 is formed of metal. More specifically, the plasmon generator 40 is formed of, for example, one of Au, Ag, Al, Cu, Pd, Pt, Rh and Ir, or an alloy composed of two or more of these elements. The shape of the plasmon generator 40 will be described in detail later.

The thermally-assisted magnetic recording head further includes a dielectric layer 23 lying on the cladding layer 22 and surrounding the plasmon generator 40, and a dielectric layer 24 lying on the plasmon generator 40 and the dielectric layer 23. The dielectric layers 23 and 24 are formed of the same material as the cladding layers 19, 21 and 22, for example.

The thermally-assisted magnetic recording head further includes a main pole 25 formed of a magnetic material and disposed on the dielectric layer 24 such that the plasmon generator 40 is interposed between the main pole 25 and the core 20, and a heat sink 26 and a nonmagnetic layer 28 disposed around the main pole 25. The heat sink 26 and the nonmagnetic layer 28 are stacked in this order on the dielectric layer 24. The nonmagnetic layer 28 is formed of alumina or Ta, for example. FIG. 3 illustrates an example in which the material of the nonmagnetic layer 28 is alumina. The heat sink 26 is provided for facilitating dissipation of heat form the plasmon generator 40. The main pole 25 and the heat sink 26 will be described in detail later.

The thermally-assisted magnetic recording head further includes a dielectric layer 29 lying on the nonmagnetic layer 28 and surrounding the main pole 25. The fourth layers of the coupling portions 13A and 13B are embedded in the cladding layer 22, the dielectric layers 23, 24 and 29, the heat sink 26 and the nonmagnetic layer 28. The top surfaces of the main pole 25, the dielectric layer 29, and the fourth layers of the coupling portions 13A and 13B are even with each other. The dielectric layer 29 is formed of the same material as the cladding layers 19, 21 and 22, for example.

The thermally-assisted magnetic recording head further includes a coil 30 disposed on the dielectric layer 29, an insulating layer 31 disposed to cover the coil 30, and a yoke layer 32 formed of a magnetic material and disposed on the main pole 25, the coupling portions 13A and 13B, the dielectric layer 29 and the insulating layer 31. The yoke layer 32 magnetically couples the main pole 25 to the coupling portions 13A and 13B. The coil 30 is planar spiral-shaped and wound around portions of the yoke layer 32 that lie on the coupling portions 13A and 13B. The coil 30 is formed of a conductive material such as copper. The insulating layer 31 is formed of a photoresist, for example.

The thermally-assisted magnetic recording head further includes a protective layer 33 disposed to cover the yoke layer 32. The protective layer 33 is formed of alumina, for example.

The parts from the return pole layer 11 to the yoke layer 32 constitute a write head unit. The coils 15 and 30 produce magnetic fields corresponding to data to be written on the recording medium 80. The return pole layer 11, the coupling portions 13A and 13B, the yoke layer 32, and the main pole 25 form a magnetic path for passing magnetic fluxes corresponding to the magnetic fields produced by the coils 15 and 30. The coils 15 and 30 are connected in series or in parallel so that the magnetic flux corresponding to the magnetic field produced by the coil 15 and the magnetic flux corresponding to the magnetic field produced by the coil 30 flow in the same direction through the main pole 25. The main pole 25 allows the magnetic flux corresponding to the magnetic field produced by the coil 15 and the magnetic flux corresponding to the magnetic field produced by the coil 30 to pass, and produces a write magnetic field for writing data on the recording medium 80 by means of a perpendicular magnetic recording system.

As has been described, the thermally-assisted magnetic recording head according to the present embodiment includes the medium facing surface 60, the read head unit, and the write head unit. The read head unit and the write head unit are stacked on the substrate 1. The write head unit is located on the trailing side, i.e., the front side in the direction of travel of the recording medium 80 (the Z direction), relative to the read head unit.

The thermally-assisted magnetic recording head may include a protective film covering the medium facing surface 60. The material of the protective film may be diamond-like-carbon (DLC) or $Ta_2O_5$, for example. The protective film is not an essential component of the thermally-assisted magnetic recording head and can be dispensed with.

The write head unit includes the coils 15 and 30, the main pole 25, the waveguide, the plasmon generator 40, and the heat sink 26. The waveguide includes the core 20 through which light propagates, and the cladding provided around the core 20. In the present embodiment, in particular, the core 20 allows laser light emitted from a non-illustrated laser diode to propagate through. The cladding includes the cladding layers 19, 21 and 22.

Figure 1:
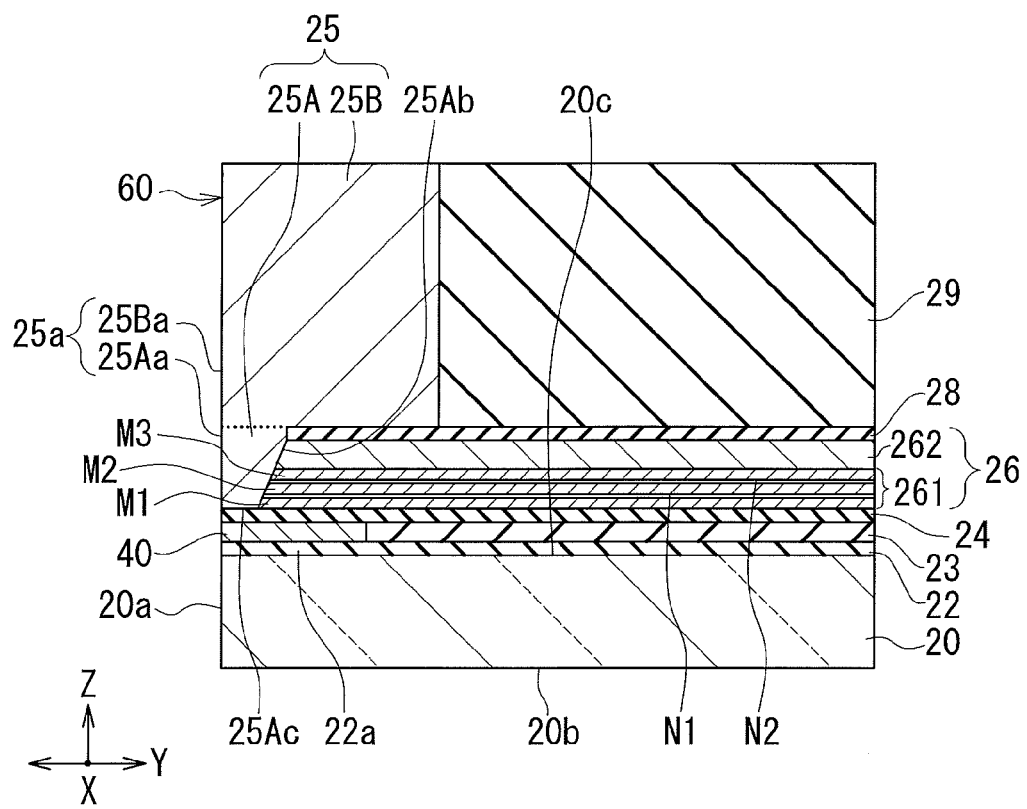
FIG. 1 is a cross-sectional view showing the main part of a thermally-assisted magnetic recording head according to a first embodiment of the invention.
Figure 2:
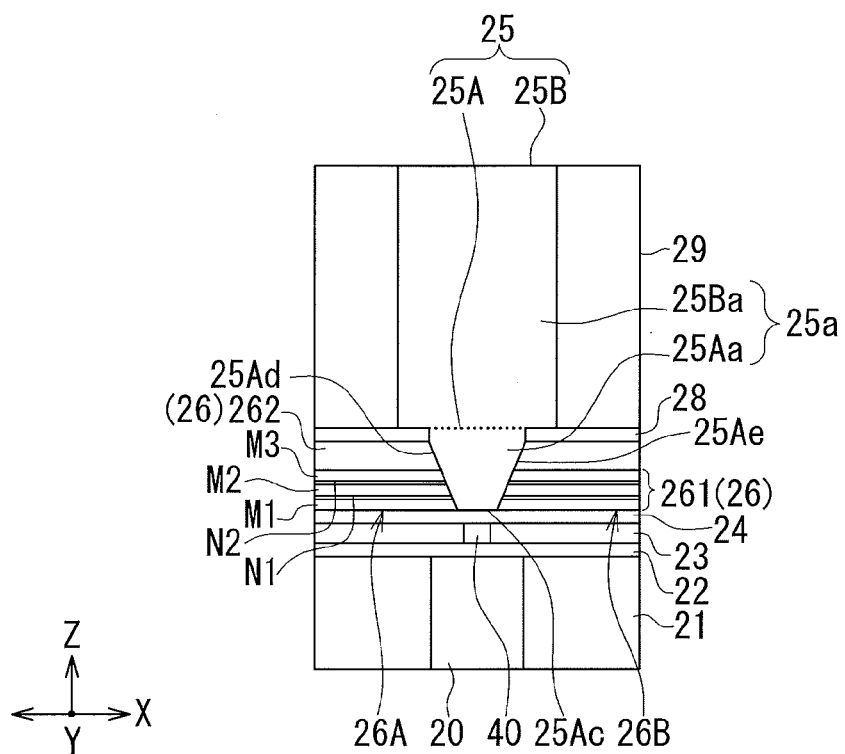
FIG. 2 is a front view showing part of the medium facing surface of the thermally-assisted magnetic recording head according to the first embodiment of the invention.

The heat sink 26 will now be described in detail with reference to FIG. 1 and FIG. 2. FIG. 1 is a cross-sectional view showing the main part of the thermally-assisted magnetic recording head according to the present embodiment. FIG. 2 is a front view showing part of the medium facing surface 60 of the thermally-assisted magnetic recording head according to the present embodiment. The heat sink 26 of the present embodiment is a multilayer heat sink including three or more layers. The heat sink 26 includes a multilayer film portion 261 lying on the dielectric layer 24 and a metal portion 262 lying on the multilayer film portion 261.

The multilayer film portion 261 includes at least a first metal layer M1, a second metal layer M2, and an intermediate layer N1. The intermediate layer N1 is interposed between the first metal layer M1 and the second metal layer M2. Each of the first metal layer M1, the second metal layer M2 and the intermediate layer N1 has an end located in the medium facing surface 60. Each of the first and second metal layers M1 and M2 is formed of a metal material. The intermediate layer N1 is formed of a material that is higher in Vickers hardness than the metal material used to form the first metal layer M1 and the metal material used to form the second metal layer M2. In the present embodiment, the material used to form the intermediate layer N1 is particularly a metal material different from the metal material used to form the first metal layer M1 and the metal material used to form the second metal layer M2. Hereinafter, the metal material used to form the first metal layer M1 and the metal material used to form the second metal layer M2 will each be referred to as a first-type metal material, and the metal material used to form the intermediate layer N1 will be referred to as a second-type metal material. The second-type metal material is higher in Vickers hardness than the first-type metal material. The first-type metal material is higher in thermal conductivity than the second-type metal material.

In the example shown in FIG. 1 and FIG. 2, the intermediate layer N1 and the second metal layer M2 are stacked in this order on the first metal layer M1. In this example, the multilayer film portion 261 further includes a second intermediate layer N2 and a third metal layer M3 stacked in this order on the second metal layer M2. The third metal layer M3 is formed of the first-type metal material. The second intermediate layer N2 is formed of the second-type metal material.

The first-type metal material can be any of Au, Ag, Al and Cu, for example. The second-type metal material can be any of Ru, Cr, Zr, Pd, Cu, Ni, Fe, Co, Ta, W, and Rh, for example. When the first-type metal material is Cu, the second-type metal material is other than Cu.

As far as the requirement that the second-type metal material be higher in Vickers hardness than the first-type metal material is satisfied, the materials used to form the metal layers M1 to M3 may all be the same or may be different from each other, or two of them may be the same. Likewise, the materials used to form the intermediate layers N1 and N2 may be the same or different from each other.

For example, the first metal layer M1, the intermediate layer N1, and the second metal layer M2 may be formed of Au, Ru, and Au, respectively, or of Au, Ru, and Cu, respectively.

The intermediate layers N1 and N2 may be smaller in thickness than the metal layers M1 to M3. The thickness of each of the metal layers M1 to M3 falls within the range of, for example, 5 to 50 nm, and preferably within the range of 10 to 30 nm. The thickness of each of the intermediate layers N1 and N2 falls within the range of, for example, 0.1 to 10 nm, and preferably within the range of 0.5 to 2 nm.

In the example shown in FIG. 1 and FIG. 2, the metal portion 262 lies on the third metal layer M3 of the multilayer film portion 261. The metal portion 262 is formed of the second-type metal material, and is greater in thickness than the metal layers M1 to M3 and the intermediate layers N1 and N2. The thickness of the metal portion 262 falls within the range of 30 to 80 nm, for example.

The heat sink 26 has an opening located near the medium facing surface 60 and exposing the top surface of the dielectric layer 24. As shown in FIG. 1, the length of the opening of the heat sink 26 in the direction perpendicular to the medium facing surface 60 (the Y direction) increases with increasing distance from the top surface 1a (see FIG. 3 and FIG. 4) of the substrate 1. As shown in FIG. 2, the width of the opening of the heat sink 26 in the track width direction (the X direction) increases with increasing distance from the top surface 1a (see FIG. 3 and FIG. 4) of the substrate 1.

The nonmagnetic layer 28 has a through opening. The edge of this opening of the nonmagnetic layer 28 is located directly above the edge of the opening of the heat sink 26 in the top surface of the heat sink 26. The opening of the heat sink 26 and the opening of the nonmagnetic layer 28 constitute a receiving space for receiving at least part of the main pole 25.

The main pole 25 will now be described in detail with reference to FIG. 1 and FIG. 2. As shown in FIG. 1 and FIG. 2, the plasmon generator 40 and the main pole 25 are aligned along the direction of travel of the recording medium 80 (the Z direction). In the present embodiment, in particular, the main pole 25 is located on the trailing side, that is, the front side in the direction of travel of the recording medium 80 relative to the plasmon generator 40. The main pole 25 includes a first portion 25A received in the receiving space mentioned above, and a second portion 25B that is located farther from the plasmon generator 40 than is the first portion 25A. In FIG. 1 and FIG. 2 the boundary between the first portion 25A and the second portion 25B is indicated in a dotted line. The second portion 25B is greater than the first portion 25A in width in the track width direction (the X direction). The heat sink 26 includes two portions 26A and 26B located on opposite sides of the first portion 25A in the track width direction.

The first portion 25A has a front end face 25Aa located in the medium facing surface 60, a rear end face 25Ab opposite to the front end face 25Aa, a bottom surface 25Ac, and two side surfaces 25Ad and 25Ae. The distance from the medium facing surface 60 to an arbitrary point on the rear end face 25Ab increases with increasing distance from the arbitrary point to the top surface 1a of the substrate 1. The side surfaces 25Ad and 25Ae increase in distance from each other with increasing distance from the top surface 1a of the substrate 1.

The second portion 25B has a front end face 25Ba located in the medium facing surface 60. The second portion 25B may include a narrow portion having the front end face 25Ba and an end opposite thereto, and a wide portion connected to the end of the narrow portion. The wide portion is greater than the narrow portion in width in the track width direction (the X direction).

The main pole 25 has an end face 25a located in the medium facing surface 60. The end face 25a is composed of the front end face 25Aa of the first portion 25A and the front end face 25Ba of the second portion 25B.

Figure 5:
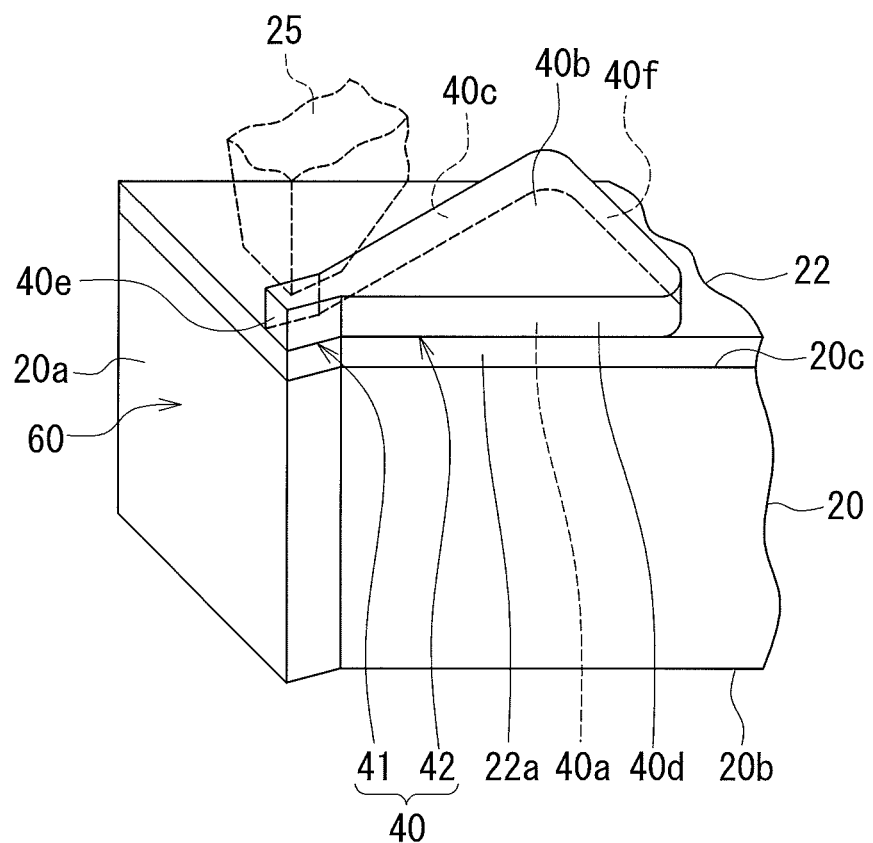
FIG. 5 is a perspective view showing a plasmon generator and its vicinity in the first embodiment of the invention.

An example of the shape of the plasmon generator 40 will now be described with reference to FIG. 5. FIG. 5 is a perspective view showing the plasmon generator 40 and its vicinity. As shown in FIG. 5, the plasmon generator 40 has a core facing surface 40a serving as a bottom surface, a top surface 40b, two side surfaces 40c and 40d, a front end face 40e, and a rear end face 40f. The front end face 40e is located in the medium facing surface 60 and connects the core facing surface 40a, the top surface 40b and the two side surfaces 40c and 40d to each other. The core facing surface 40a faces the surface of the core 20, particularly the evanescent light generating surface 20c.

The front end face 40e generates near-field light on the principle to be described later. For example, the plasmon generator 40 is rectangular in cross section parallel to the medium facing surface 60. The thickness (the dimension in the Z direction) of the plasmon generator 40 is generally constant regardless of the distance from the medium facing surface 60.

Further, as shown in FIG. 5, the plasmon generator 40 includes a narrow portion 41 located near the medium facing surface 60, and a wide portion 42 that is located farther from the medium facing surface 60 than is the narrow portion 41. The width of the narrow portion 41 in the direction parallel to the medium facing surface 60 and to the evanescent light generating surface 20c of the core 20 (the X direction) may be constant regardless of the distance from the medium facing surface 60 or may decrease toward the medium facing surface 60. The wide portion 42 is located on a side of the narrow portion 41 farther from the front end face 40e and is connected to the narrow portion 41. The width of the wide portion 42 in the track width direction (the X direction) is equal to that of the narrow portion 41 at the boundary between the narrow portion 41 and the wide portion 42, and is greater than that of the narrow portion 41 in the other positions.

The core facing surface 40a is located at a predetermined distance from the evanescent light generating surface 20c and faces the evanescent light generating surface 20c. The cladding layer 22 includes an interposition part 22a interposed between the evanescent light generating surface 20c and the core facing surface 40a. Since the cladding layer 22 is part of the cladding, the cladding can be said to include the interposition part 22a.

Now, the principle of generation of near-field light in the present embodiment and the principle of thermally-assisted magnetic recording using the near-field light will be described in detail. Laser light emitted from a laser diode (not illustrated) enters the core 20. As shown in FIG. 3, the laser light 50 propagates through the core 20 toward the medium facing surface 60, and reaches the vicinity of the plasmon generator 40. The evanescent light generating surface 20c of the core 20 generates evanescent light based on the laser light 50 propagating through the core 20. More specifically, the laser light 50 is totally reflected at the evanescent light generating surface 20c, and this causes the evanescent light generating surface 20c to generate evanescent light permeating into the interposition part 22a. In the plasmon generator 40, surface plasmons are excited on the core facing surface 40a through coupling with the evanescent light. The surface plasmons propagate to the front end face 40e, and the front end face 40e generates near-field light based on the surface plasmons.

The near-field light generated from the front end face 40e is projected toward the recording medium 80, reaches the surface of the recording medium 80 and heats a part of the magnetic recording layer of the recording medium 80. This lowers the coercivity of the part of the magnetic recording layer. In thermally-assisted magnetic recording, the part of the magnetic recording layer with the lowered coercivity is subjected to a write magnetic field produced by the main pole 25 for data writing.

In the present embodiment, the plasmon generator 40 includes the narrow portion 41 and the wide portion 42. When compared with the case where the wide portion 42 is not provided, the present embodiment allows the core facing surface 40a to be larger in area and thus able to excite more surface plasmons. The present embodiment thus allows for generation of near-field light of sufficient intensity.

A method of manufacturing the thermally-assisted magnetic recording head according to the present embodiment will now be described. The method of manufacturing the thermally-assisted magnetic recording head includes the steps of: forming components of a plurality of thermally-assisted magnetic recording heads, except the substrates 1, on a wafer that includes portions to become the substrates 1 of the plurality of thermally-assisted magnetic recording heads, thereby fabricating a substructure including a plurality pre-head portions arranged in rows, the plurality of pre-head portions becoming individual thermally-assisted magnetic recording heads later; and cutting the substructure to separate the plurality of pre-head portions from each other and forming the medium facing surface 60 for each of the plurality of pre-head portions (this step will be referred to as the step of forming the medium facing surface 60). A plurality of thermally-assisted magnetic recording heads are produced in this manner.

The method of manufacturing the thermally-assisted magnetic recording head according to the present embodiment will now be described in more detail with attention focused on a single thermally-assisted magnetic recording head. In the method of manufacturing the thermally-assisted magnetic recording head, the insulating layer 2 and the bottom shield layer 3 are first formed in this order on the substrate 1. Next, the insulating layer 4 is formed to cover the bottom shield layer 3. The insulating layer 4 is then polished by, for example, chemical mechanical polishing (hereinafter referred to as CMP), until the bottom shield layer 3 is exposed. Next, the MR element 5 and the insulating layer 6 are formed on the bottom shield layer 3 and the insulating layer 4. The top shield layer 7 is then formed on the MR element 5 and the insulating layer 6. Next, the insulating layer 8 is formed to cover the top shield layer 7. The insulating layer 8 is then polished by, for example, CMP, until the top shield layer 7 is exposed.

Next, the nonmagnetic layer 10 is formed on the top shield layer 7 and the insulating layer 8. The return pole layer 11 is then formed on the nonmagnetic layer 10. Next, the insulating layer 12 is formed to cover the return pole layer 11. The insulating layer 12 is then polished by, for example, CMP, until the return pole layer 11 is exposed. Next, the insulating layer 14 is formed on the return pole layer 11 and the insulating layer 12. The insulating layer 14 is then selectively etched to form therein two openings for exposing the top surface of the return pole layer 11. Next, the first layers of the coupling portions 13A and 13B are formed on the return pole layer 11 at the positions of the two openings. Next, the coil 15 is formed on the insulating layer 14.

The insulating layer 16 is then formed in the space between every adjacent turns of the coil 15. Next, the insulating layer 17 is formed over the entire top surface of the stack. The insulating layer 17 is then polished by, for example, CMP, until the coil 15 and the first layers of the coupling portions 13A and 13B are exposed. Next, the insulating layer 18 is formed over the entire top surface of the stack. The insulating layer 18 is then selectively etched to form therein two openings for exposing the top surfaces of the first layers of the coupling portions 13A and 13B. Next, the second layers of the coupling portions 13A and 13B are formed on the first layers of the coupling portions 13A and 13B, respectively. Next, the cladding layer 19 is formed over the entire top surface of the stack. The cladding layer 19 is then polished by, for example, CMP, until the second layers of the coupling portions 13A and 13B are exposed.

Reference is now made to FIG. 6 through FIG. 13 to describe steps to be performed after the polishing of the cladding layer 19 up to the formation of the dielectric layer 29. FIG. 6 through FIG. 13 each show a stack of layers formed in the process of manufacturing the thermally-assisted magnetic recording head. Note that portions located below the core 20 are omitted from FIG. 6 through FIG. 13. Each of FIG. 6 through FIG. 13 shows a cross section of the stack taken in the position at which the medium facing surface 60 is to be formed.

Figure 6:
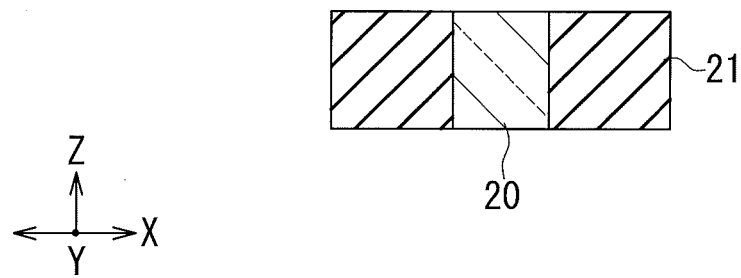
FIG. 6 is a cross-sectional view showing a step of a method of manufacturing a plurality of thermally-assisted magnetic recording heads according to the first embodiment of the invention.

FIG. 6 shows a step that follows the polishing of the cladding layer 19. In this step, first, the core 20 is formed on the cladding layer 19. Then, the third layers of the coupling portions 13A and 13B are formed on the second layers of the coupling portions 13A and 13B, respectively. Next, the cladding layer 21 is formed over the entire top surface of the stack. The cladding layer 21 is then polished by, for example, CMP, until the core 20 and the third layers of the coupling portions 13A and 13B are exposed.

Figure 7:
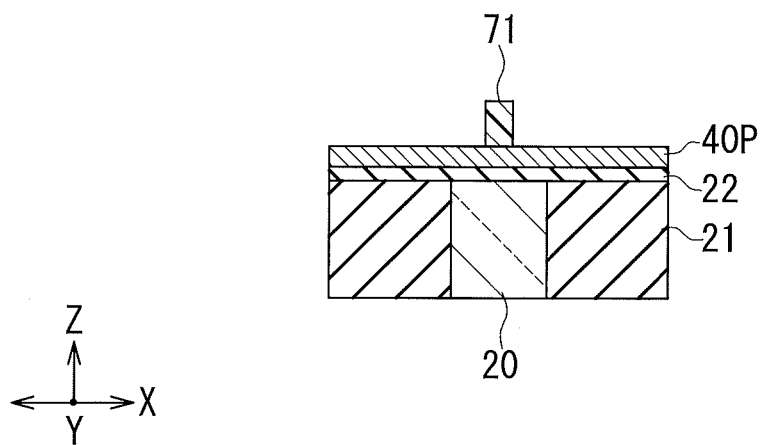
FIG. 7 is a cross-sectional view showing a step that follows the step shown in FIG. 6.

FIG. 7 shows the next step. In this step, first, the cladding layer 22 is formed over the entire top surface of the stack. Then, a metal film 40P, which later becomes the plasmon generator 40, is formed on the cladding layer 21. An etching mask 71 is then formed to cover a portion of the metal film 40P that will make the plasmon generator 40. Either a photoresist mask or a hard mask is used as the etching mask 71. The hard mask may be formed of Ta, $SiO_2$, or alumina, for example. FIG. 7 shows an example in which a photoresist mask is used as the etching mask 71.

Figure 8:
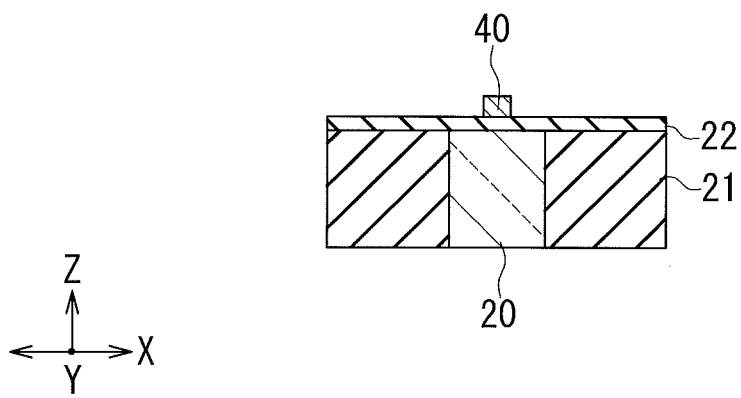
FIG. 8 is a cross-sectional view showing a step that follows the step shown in FIG. 7.

FIG. 8 shows the next step. In this step, first, the metal film 40P is etched in part by, for example, ion beam etching (hereinafter referred to as IBE) or reactive ion etching (hereinafter referred to as RIE) using the etching mask 71. Where IBE is employed to etch the metal film 40P, a photoresist mask is used as the etching mask 71. Where RIE is employed to etch the metal film 40P, a hard mask is used as the etching mask 71. To etch the metal film 40P by RIE, a gas containing $O_2$ or $N_2$, for example, is used as the etching gas. The metal film 40P is etched into the plasmon generator 40. The etching mask 71 is then removed.

Figure 9:
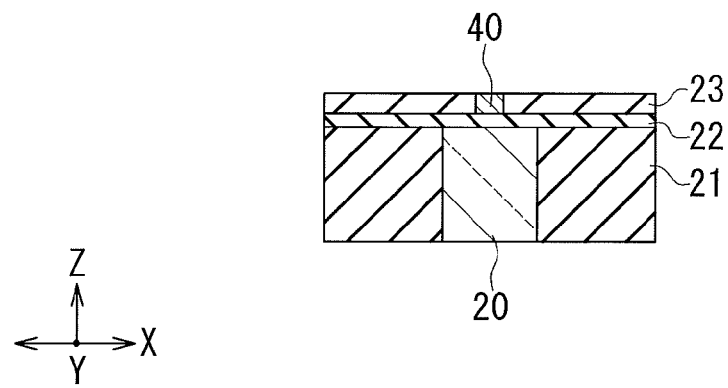
FIG. 9 is a cross-sectional view showing a step that follows the step shown in FIG. 8.

FIG. 9 shows the next step. In this step, first, the dielectric layer 23 is formed to cover the plasmon generator 40. The dielectric layer 23 is then polished by, for example, CMP, until the plasmon generator 40 is exposed.

Figure 10:
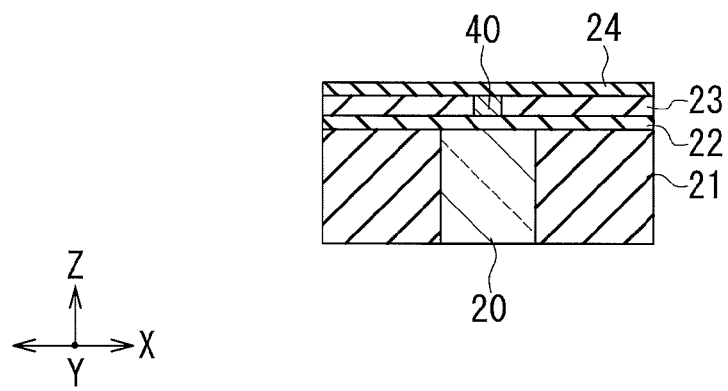
FIG. 10 is a cross-sectional view showing a step that follows the step shown in FIG. 9.

FIG. 10 shows the next step. In this step, the dielectric layer 24 is formed on the plasmon generator 40 and the dielectric layer 23.

Figure 11:
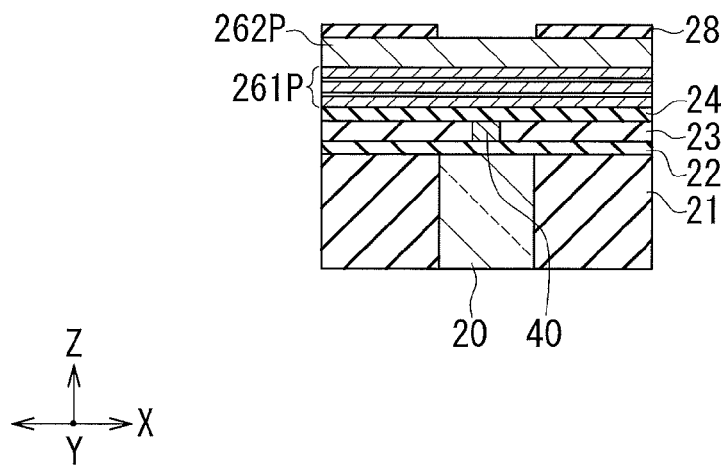
FIG. 11 is a cross-sectional view showing a step that follows the step shown in FIG. 10.

FIG. 11 shows the next step. In this step, a plurality of films that later become the layers of the multilayer film portion 261 of the heat sink 26 are formed in succession on the dielectric layer 24 by sputtering, for example. A multilayer film 261P composed of the plurality of films is thereby formed. Then, an initial metal portion 262P, which later becomes the metal portion 262 of the heat sink 26, is formed on the multilayer film 261P. The nonmagnetic layer 28 is then formed on the initial metal portion 262P. The nonmagnetic layer 28 has an opening shaped to correspond to the planar shape (the shape in a plan view) of the first portion 25A of the main pole 25 to be formed later.

Figure 12:
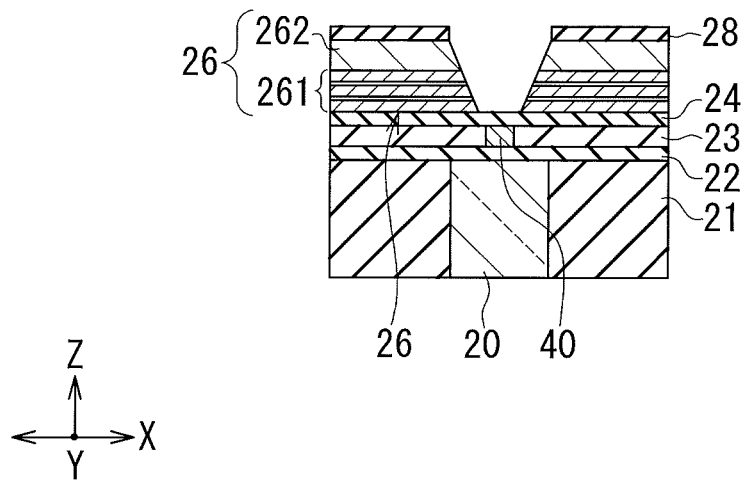
FIG. 12 is a cross-sectional view showing a step that follows the step shown in FIG. 11.

FIG. 12 shows the next step. In this step, the multilayer film 261P and the initial metal portion 262P are taper-etched by, for example, RIE, using the nonmagnetic layer 28 as the etching mask. When etching the multilayer film 261P and the initial metal portion 262P by RIE, a gas containing $O_2$ and $Cl_2$, for example, is used as the etching gas so as to increase the etching selectivity, that is, the ratio between the etching rate of the multilayer film 261P and the initial metal portion 262P and the etching rate of the dielectric layer 24 and the nonmagnetic layer 28. This etching makes the multilayer film 261P and the initial metal portion 262P into the multilayer film portion 261 and the metal portion 262, respectively. The heat sink 26 is thereby completed.

Figure 13:
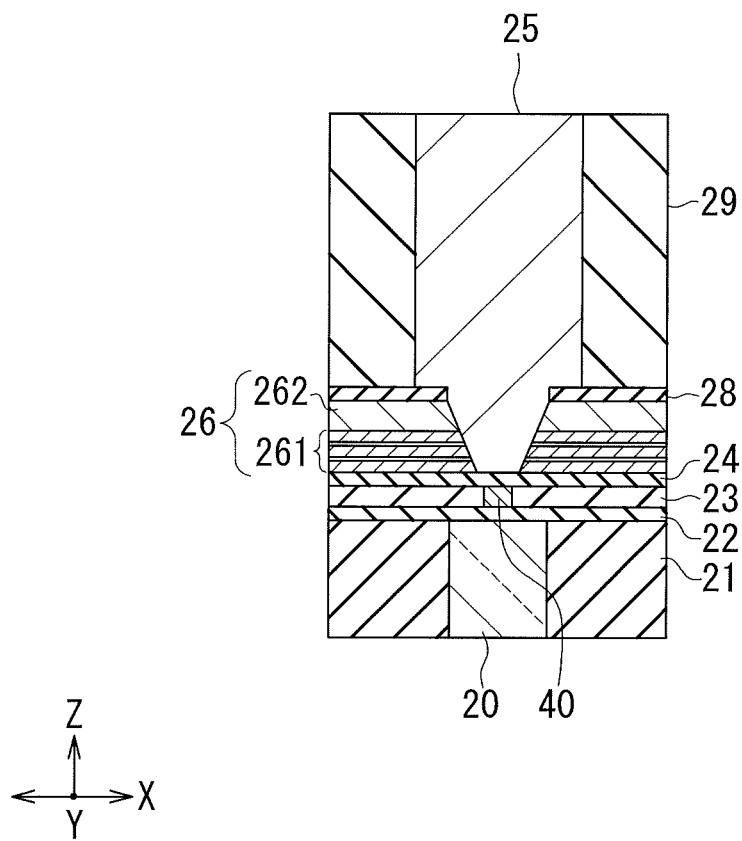
FIG. 13 is a cross-sectional view showing a step that follows the step shown in FIG. 12.

FIG. 13 shows the next step. In this step, the cladding layer 22, the dielectric layers 23 and 24, the heat sink 26 and the nonmagnetic layer 28 are selectively etched to form therein two openings for exposing the top surfaces of the third layers of the coupling portions 13A and 13B. Next, although not illustrated, a seed layer is formed over the entire top surface of the stack. Using the seed layer as an electrode and a seed, the main pole 25 and the fourth layers of the coupling portions 13A and 13B are then formed by plating. Next, the seed layer, except portions thereof lying under the main pole 25 and the fourth layers of the coupling portions 13A and 13B, is removed. The dielectric layer 29 is then formed over the entire top surface of the stack. Then, the dielectric layer 29 is polished by, for example, CMP, until the main pole 25 and the fourth layers of the coupling portions 13A and 13B are exposed.

Now, steps to follow the step of FIG. 13 will be described with reference to FIG. 3 and FIG. 4. First, the coil 30 is formed on the dielectric layer 29. The insulating layer 31 is then formed to cover the coil 30. Next, the yoke layer 32 is formed over the main pole 25, the coupling portions 13A and 13B and the insulating layer 31. Then, the protective layer 33 is formed to cover the yoke layer 32. Wiring, terminals, and other components are then formed on the top surface of the protective layer 33. When the substructure is completed thus, the step of forming the medium facing surface 60 is performed. A protective film for covering the medium facing surface 60 may be formed thereafter. Being provided with the medium facing surface 60, each pre-head portion becomes a thermally-assisted magnetic recording head.

The step of forming the medium facing surface 60 includes the step of polishing the surface that is formed for each pre-head portion by cutting the substructure, and the step of forming a rail on the polished surface for allowing the slider to fly.

The effects of the thermally-assisted magnetic recording head according to the present embodiment will now be described. In the thermally-assisted magnetic recording head according to the present embodiment, the heat sink 26 functioning to facilitate dissipation of heat from the plasmon generator 40 is provided near the plasmon generator 40. By virtue of the function of the heat sink 26, the present embodiment allows for suppressing the temperature rise of the plasmon generator 40. Consequently, the present embodiment makes it possible to prevent expansion of the plasmon generator 40 and its surroundings so that the medium facing surface 60 will not protrude in part toward the recording medium 80, and makes it possible to prevent the plasmon generator 40 from being deformed or broken.

The heat sink 26 of the present embodiment includes at least the first metal layer M1, the second metal layer M2, and the intermediate layer N1. The intermediate layer N1 is interposed between the first metal layer M1 and the second metal layer M2. The intermediate layer N1 is formed of a material that is higher in Vickers hardness than the metal material used to form the first metal layer M1 and the metal material used to form the second metal layer M2. This makes it possible to prevent deformation of the first metal layer M1 and the second metal layer M2 sandwiching the intermediate layer N1. Further, the heat sink 26 of the present embodiment achieves higher mechanical strength as a whole when compared with a heat sink formed of a single metal layer of the first-type metal material. The foregoing features of the heat sink 26 of the present embodiment make it possible to prevent deformation or breakage of the heat sink 26 resulting from a temperature rise of the heat sink 26 or contact of the medium facing surface 60 with the recording medium 80. Consequently, the present embodiment allows for preventing degradation in performance of the heat sink 26.

In the heat sink 26 of the present embodiment, each of the first metal layer M1, the second metal layer M2 and the intermediate layer N1 has an end located in the medium facing surface 60. This makes it possible to facilitate dissipation of heat from the front end face 40e and its vicinity, which are portions of the plasmon generator 40 that most tend to become hot.

As can be seen from the foregoing, the present embodiment makes it possible to provide a thermally-assisted magnetic recording head of high reliability that is capable of preventing deformation or breakage of the heat sink 26 and thereby allows for suppression of the temperature rise of the plasmon generator 40.

The above-described effects become more noticeable when the heat sink 26 includes one or more pairs of an intermediate layer and a metal layer in addition to the first metal layer M1, the second metal layer M2 and the intermediate layer N1.

Furthermore, the heat sink 26 of the present embodiment provides additional effects as described below when configured so that a metal layer is sandwiched between two intermediate layers. A metal layer is typically formed of a metal polycrystal. In general, when a metal polycrystal gets hot, a plurality of crystal grains constituting the metal polycrystal aggregate and grow, and can thereby cause the metal polycrystal to be deformed. If a metal layer is sandwiched between two intermediate layers, the metal layer is restrained to some extent by the two intermediate layers. In such a case, it is thus possible to prevent the aggregation and growth of the plurality of crystal grains constituting the metal layer (the metal polycrystal) when the metal layer gets hot. This consequently allows for preventing the metal layer from becoming deformed.

The second-type metal material used to form each of the intermediate layers N1 and N2 is lower in thermal conductivity than the first-type metal material used to form each of the metal layers M1 to M3. The intermediate layers N1 and N2 are preferably smaller in thickness than the metal layers M1 to M3 so that the performance of the heat sink 26 will not be degraded by the inclusion of the intermediate layers N1 and N2 in the heat sink 26.

In the present embodiment, the heat sink 26 includes not only the metal layers M1 to M3 and the intermediate layers N1 and N2 but also the metal portion 262 formed of the second-type metal material. This allows for further enhancement of the mechanical strength of the heat sink 26 as a whole. The metal portion 262 is located farther from the plasmon generator 40 than is the multilayer film portion 261. The metal portion 262 thus has little effect on the performance of the heat sink 26.

Second Embodiment

Figure 14:
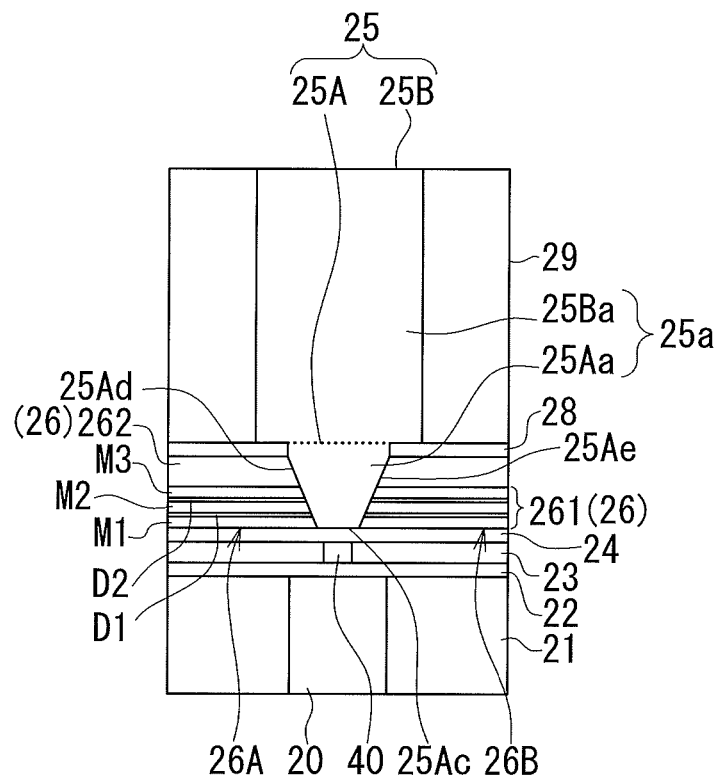
FIG. 14 is a front view showing part of the medium facing surface of a thermally-assisted magnetic recording head according to a second embodiment of the invention.
Figure 14:
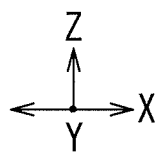

A thermally-assisted magnetic recording head according to a second embodiment of the invention will now be described with reference to FIG. 14. FIG. 14 is a front view showing part of the medium facing surface of the thermally-assisted magnetic recording head according to the present embodiment. The multilayer film portion 261 of the heat sink 26 of the present embodiment includes at least a first metal layer M1, a second metal layer M2, and an intermediate layer D1. The intermediate layer D1 is interposed between the first metal layer M1 and the second metal layer M2. Each of the first metal layer M1, the second metal layer M2 and the intermediate layer D1 has an end located in the medium facing surface 60. Each of the first and second metal layers M1 and M2 is formed of a metal material. The intermediate layer D1 is formed of a material that is higher in Vickers hardness than the metal material used to form the first metal layer M1 and the metal material used to form the second metal layer M2. In the present embodiment, the intermediate layer D1 is formed of a dielectric material, in particular.

In the example shown in FIG. 14, the intermediate layer D1 and the second metal layer M2 are stacked in this order on the first metal layer M1. In this example, the multilayer film portion 261 further includes a second intermediate layer D2 and a third metal layer M3 stacked in this order on the second metal layer M2. The second intermediate layer D2 is formed of a dielectric material. The third metal layer M3 is formed of a metal material.

Each of the metal materials used to form the metal layers M1 to M3 may be one of Au, Ag, Al, and Cu, for example. Each of the dielectric materials used to form the intermediate layers D1 and D2 may be, for example, one of SiO$_2$, alumina, tantalum oxide, SiON, ZrN, TiN, ZrOx, HfOx, and NbOx, where "x" in ZrOx, HfOx and NbOx represents any number greater than zero.

The materials used to form the metal layers M1 to M3 may all be the same or may be different from each other. Alternatively, two of them may be the same with the other different from the two. Likewise, the materials used to form the intermediate layers D1 and D2 may be the same or different from each other.

The intermediate layers D1 and D2 may be smaller in thickness than the metal layers M1 to M3. The thickness of each of the intermediate layers D1 and D2 preferably falls within the range of 0.1 to 10 nm, and more preferably within the range of 0.5 to 2 nm. The preferred thickness range for the metal layers M1 to M3 is the same as that in the first embodiment.

The remainder of configuration, function and effects of the present embodiment are similar to those of the first embodiment.

The present invention is not limited to the foregoing embodiments, and various modifications may be made thereto. For example, as far as the requirements of the appended claims are met, the numbers of the metal layers and the intermediate layers of the heat sink 26, and the shapes and locations of the main pole 25, the core 20, the plasmon generator 40 and the heat sink 26 are not limited to the respective examples illustrated in the foregoing embodiments but can be chosen as desired. For example, the heat sink 26 may include two portions insulated from the plasmon generator 40 and located on opposite sides of the plasmon generator 40 in the track width direction. Further, the metal portion 262 is not an essential component of the heat sink 26 and can be dispensed with.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A thermally-assisted magnetic recording head comprising:
    a medium facing surface facing a recording medium;
    a main pole producing a write magnetic field for writing data on the recording medium;
    a waveguide including a core through which light propagates, and a cladding provided around the core;
    a plasmon generator configured to excite a surface plasmon based on the light propagating through the core; and
    a heat sink facilitating dissipation of heat from the plasmon generator, wherein
    the heat sink includes a first metal layer, a second metal layer, and an intermediate layer,
    the intermediate layer is interposed between the first metal layer and the second metal layer,
    each of the first and second metal layers is formed of a metal material,
    the intermediate layer is formed of a material that is higher in Vickers hardness than the metal material used to form the first metal layer and the metal material used to form the second metal layer,
    the first metal layer, the intermediate layer and the second layer are aligned along a direction of travel of the recording medium,
    the plasmon generator and the main pole are aligned the direction of travel of the recording medium, and
    the heat sink includes two portions that are located on opposite sides of a portion of the main pole, in the track width direction, so that the portion of the main pole is interposed between the two portions of the heat sink.

2. The thermally-assisted magnetic recording head according to claim 1, wherein each of the first metal layer, the second metal layer and the intermediate layer has an end located in the medium facing surface.

3. The thermally-assisted magnetic recording head according to claim 1, wherein the intermediate layer is smaller in thickness than the first and second metal layers.

4. The thermally-assisted magnetic recording head according to claim 1, wherein the material used to form the intermediate layer is a metal material different from the metal material used to form the first metal layer and the metal material used to form the second metal layer.

5. The thermally-assisted magnetic recording head according to claim 1, wherein the material used to form the intermediate layer is a dielectric material.

6. The thermally-assisted magnetic recording head according to claim 1, wherein the metal material used to form the first metal layer and the metal material used to form the second metal layer are both Au.

7. The thermally-assisted magnetic recording head according to claim 1, wherein
    the core has an evanescent light generating surface to generate evanescent light based on the light propagating through the core,
    the plasmon generator has a core facing surface facing the evanescent light generating surface, and
    the cladding includes an interposition part interposed between the evanescent light generating surface and the core facing surface.

* * * * *